(12) United States Patent
Zhang et al.

(10) Patent No.: US 11,870,323 B2
(45) Date of Patent: Jan. 9, 2024

(54) ULTRA-THIN VEHICLE-MOUNTED MAGNETIC SUSPENSION FLYWHEEL BATTERY AND OPERATING METHOD THEREOF

(71) Applicant: JIANGSU UNIVERSITY, Zhenjiang (CN)

(72) Inventors: Weiyu Zhang, Zhenjiang (CN); Juexin Yu, Zhenjiang (CN); Long Shan, Zhenjiang (CN); Huangqiu Zhu, Zhenjiang (CN); Kai Li, Zhenjiang (CN); Xiaoxiao Zhang, Zhenjiang (CN); Zhen Wang, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/639,333

(22) PCT Filed: Jun. 3, 2021

(86) PCT No.: PCT/CN2021/098102
§ 371 (c)(1),
(2) Date: Feb. 28, 2022

(87) PCT Pub. No.: WO2022/236896
PCT Pub. Date: Nov. 17, 2022

(65) Prior Publication Data
US 2023/0396124 A1    Dec. 7, 2023

(30) Foreign Application Priority Data

May 13, 2021 (CN) .......................... 202110521559.9

(51) Int. Cl.
*F16C 32/04* (2006.01)
*H02K 7/09* (2006.01)
(Continued)

(52) U.S. Cl.
CPC .............. *H02K 7/025* (2013.01); *B60L 50/30* (2019.02); *H02K 7/09* (2013.01)

(58) Field of Classification Search
CPC ............ H02K 7/025; H02K 7/02; H02K 1/27; H02K 7/09; F16C 32/0489;
(Continued)

(56) References Cited

U.S. PATENT DOCUMENTS 4,870,310 A * 9/1989 Triplett ............... F16C 32/0444
310/74
2010/0001697 A1 * 1/2010 Hsu ........................ H02K 7/025
417/415

(Continued)

FOREIGN PATENT DOCUMENTS

CN      107387558 A    11/2017
CN      107425647 A    12/2017
(Continued)

*Primary Examiner* — Michael Andrews
(74) *Attorney, Agent, or Firm* — Bayramoglu Law Offices LLC

(57) ABSTRACT

An ultra-thin vehicle-mounted magnetic suspension flywheel battery for an electric vehicle and an operating method thereof are provided. A motor bracket, an axial flux motor, a flywheel, and an inner stator, a coil, and a permanent magnet of a five-degree-of-freedom magnetic bearing are coaxially arranged in a shell from top to bottom. The flywheel consists of an upper layer, a middle layer, and a lower layer which are continuous. An upper annular groove is formed in a middle of a flywheel upper annular layer of the upper layer. The axial flux motor is placed in the upper annular groove. An annular inner groove, a middle-layer annular cavity, and a lower annular groove are communicated with each other and jointly used for placing the inner stator, the coil, and the permanent magnet of the five-degree-of-freedom magnetic bearing.

10 Claims, 10 Drawing Sheets

(51) Int. Cl.
*H02K 7/02* (2006.01)
*B60L 50/30* (2019.01)

(58) Field of Classification Search
CPC .............. F16C 32/0406; F16C 32/044; F16C 32/0459; F16C 32/047; B60L 50/30
USPC .......................................................... 310/74
See application file for complete search history.

(56) References Cited

U.S. PATENT DOCUMENTS

2010/0282528 A1* 11/2010 Palti .................. B60K 1/04
310/90.5
2015/0054389 A1* 2/2015 Filatov ............... F16C 32/0465
310/68 B

FOREIGN PATENT DOCUMENTS

| CN | 109831056 A | 5/2019 |
| CN | 110112860 A | 8/2019 |

* cited by examiner

ULTRA-THIN VEHICLE-MOUNTED MAGNETIC SUSPENSION FLYWHEEL BATTERY AND OPERATING METHOD THEREOF

CROSS REFERENCE TO THE RELATED APPLICATIONS

This application is the national phase entry of International Application No. PCT/CN2021/098102, filed on Jun. 3, 2021, which is based upon and claims priority to Chinese Patent Application No. 202110521559.9, filed on May 13, 2021, the entire contents of which are incorporated herein by reference.

TECHNICAL FIELD

The present invention relates to a flywheel battery, also known as a flywheel energy storage device, and specifically to a five-degree-of-freedom magnetic suspension flywheel battery for an electric vehicle.

BACKGROUND

A flywheel battery is a new concept energy storage device, which breaks through the limitations of chemical batteries and realizes physical energy storage through high-speed rotation of a flywheel. It has the characteristics of no pollution, high energy conversion efficiency and power density, long cycle life, and insensitivity to temperature, and is a power battery with great development potential in the field of new energy vehicles. At present, the main obstacles to the practical application and popularization of vehicle-mounted magnetic suspension flywheel batteries include the occupation of a large axial space, and low safety and stability and excessive loss in the case of complex vehicle driving conditions and road conditions (i.e., changing vehicle driving conditions and road conditions, etc.).

Occupation of space: At present, the topology of most flywheel battery systems is to independently arrange a flywheel rotor, a magnetic bearing, and a motor around an inertia spindle. Due to the existence of the inertia spindle, the entire topology extends axially. However, the extension of the entire topology of the flywheel battery in the axial space is limited by the vehicle environment, and the limitation of the axial length will affect the critical speed of the flywheel, which in turn affects the energy storage characteristics of the flywheel. As a result, the properties of conventional flywheel battery topologies with an inertia spindle are often limited by the utilization rate of the axial space. Although Chinese Patent Application No. 201910072060.7 entitled "Virtual-spindle magnetic suspension flywheel energy storage device for electric vehicles" proposes a topology without an "inertia spindle", in which the flywheel is embedded with part of the magnetic bearing. The "spindle-free" structure embedded with the motor can well solve this problem. Therefore, the removal of the "inertia spindle" is especially suitable for the application of vehicle-mounted flywheel batteries, and can well reduce the occupation of the axial space. Because there is still room for further reduction in the axial length of the current "spindle-free" flywheel battery system, it is of great research significance to further reduce the axial space utilization, or even design an "ultra-thin" topology that can be more conveniently installed in any position of a vehicle to facilitate the promotion and application of vehicle-mounted magnetic suspension flywheel battery systems.

Stability: The vehicle-mounted flywheel battery will inevitably be affected by the high-speed rotation of the flywheel, vehicle driving conditions (uphill, downhill, starting, accelerating, decelerating, braking, and turning), and complex road conditions, resulting in serious gyroscopic effects, thus affecting the system stability. At present, most flywheel battery systems adopt a magnetic bearing based on Maxwell force (reluctance magnetic bearing) to control the stability of the flywheel, that is, adopt either a permanent magnet bearing, a hybrid magnetic bearing, an active magnetic bearing, or a combination of several forms of magnetic bearings. Such a combination of magnetic bearings is still a magnetic bearing system. For the reluctance magnetic bearing, the electromagnetic force is changed by controlling the amount of air-gap flux. A Lorentz force magnetic bearing is a type of magnetic bearing which is different from conventional magnetic bearings based on the principle of Maxwell force. The electromagnetic force of the Lorentz force magnetic bearing is proportional to the current, and the electromagnetic force of the reluctance magnetic bearing is proportional to the square of the control current, so the Lorentz force magnetic bearing is of high control precision but has a small bearing capacity and large loss, while the reluctance magnetic bearing has a large bearing capacity but is of low precision. Therefore, if magnetic bearings with different properties are used in combination in the suspension system of the vehicle-mounted flywheel battery to make use of the advantages of these types of magnetic bearings, not only the bearing capacity of the suspension supporting bearing system can be improved, but also the control precision can be improved, thereby significantly improving the stability of the flywheel.

System loss and control: At present, in a control strategy commonly used for vehicle-mounted flywheel battery systems, almost all magnetic bearings participate in the control of the system at the same moment. Although the Lorentz force magnetic bearing is of high control precision, the loss caused by the control coil is relatively high. In the case of simple vehicle driving conditions and road conditions (e.g., when the vehicle is stationary, the vehicle is moving at a constant speed, the road surface is flat, or the flywheel is in standby state), if the Lorentz force magnetic bearing is always in the operating state for higher control precision, excessive loss will be caused, and the excessive loss cannot achieve the purpose of achieving higher control precision as expected. The conventional reluctance magnetic bearing is sufficient to ensure the control precision of the flywheel under simple operating conditions. In contrast, in the case of complex vehicle driving conditions and road conditions (e.g., uphill, downhill, starting, accelerating, decelerating, braking, turning, changing road conditions, etc.), if Lorentz force magnetic bearings are additionally used in the control of certain degrees of freedom, the control precision of the entire system can be significantly improved without greatly increasing the loss, thereby ensuring the high-stability operation of the flywheel.

Conventional motors for flywheel batteries are generally formed by lamination of silicon steel sheets, and most flywheels adopt radial flux motors, so the iron consumption is still high. Using appropriate new materials to replace conventional silicon steel sheets or using axial flux motors to replace conventional radial motors can substantially reduce the iron loss, which is especially suitable for vehicle-mounted flywheel battery systems.

Load-bearing mode of flywheel: At present, an electromagnetic attraction force in a direction opposite to that of the flywheel gravity is generally used to balance gravity. However, this mode has the following problems: For example, when the flywheel is disturbed and deviated downward, the air gap increases, the air-gap flux decreases, and the electromagnetic force decreases, which leads to a further deviation of the flywheel. If an element of "repulsive force" is added to the entire flywheel battery system to enable the flywheel to be resistant to slight disturbance caused by operating conditions by skillful arrangement of permanent magnets, the repulsive force can be used to achieve self-balancing of the magnetic bearing, thereby reducing the loss caused by the control coil. In addition, the advantage of self-balancing using the repulsive force can effectively reduce the impact force caused by the flywheel flying out due to failure, thereby improving the safety of the flywheel battery system.

Safety: The safety shield of the flywheel battery system usually provides sealing and safety protection functions. At present, a plate-like or net-shaped protective shell is usually used for flywheel batteries, which are often resistant to high-speed composite flywheels or large-mass metal flywheels, resulting in insufficient safety. Such a shell is of large mass, insufficient safety, and poor sound insulation effect, which limits its application and promotion. Foamed metal is a special metal material containing foam pores. With the unique structural characteristics, foamed metal has a series of advantages such as low density, good heat insulation performance, good sound insulation performance, strong impact resistance, and ability to absorb electromagnetic waves. If foamed metal is used in a flywheel battery system, the safety of the flywheel battery system can be significantly improved, and a noise reduction effect can be achieved for the flywheel battery.

Therefore, in order to overcome the deficiencies of existing vehicle-mounted flywheel battery systems or fill in the technical gap, it is of great significance to design an ultra-thin vehicle-mounted magnetic suspension flywheel battery with high safety, high stability, and low loss.

SUMMARY

To solve the above-mentioned existing technical problems to the greatest extent, an objective of the present invention is to design a magnetic suspension flywheel battery for electric vehicles with high integration, high stability, high safety, low loss, and good energy storage performance, and to provide a new control method, to achieve the safe, stable suspension and rotation of the nested disc flywheel with low energy consumption.

According to a technical solution, the present invention provides an ultra-thin vehicle-mounted magnetic suspension flywheel battery, comprising a shell, wherein a motor bracket, an axial flux motor, a flywheel, and an inner stator, a coil, and a permanent magnet of a five-degree-of-freedom magnetic bearing are coaxially arranged in the shell from top to bottom, wherein the flywheel consists of an upper layer, a middle layer, and a lower layer which are continuous, the upper layer is a flywheel upper annular layer which is in a shape of a circular ring, an upper annular groove is formed in a middle of the flywheel upper annular layer, and the axial flux motor is placed in the upper annular groove; the middle layer is a flywheel middle layer consisting of a flywheel disc layer and a flywheel double ring layer below the flywheel disc layer, the flywheel disc layer is in a shape of a solid disc, the flywheel double ring layer consists of an annular flywheel rotor pole and a flywheel annular outer layer coaxially distributed with respect to a central axis, the flywheel rotor pole is in a shape of a circular ring concentrically protruding downward from a middle of a lower surface of the flywheel disc layer, an annular inner groove is formed in a middle of the flywheel rotor pole, an outer circumference of the flywheel annular outer layer is a spherical envelope surface, and a middle-layer annular cavity is formed between an inner wall of the flywheel annular outer layer and an outer wall of the flywheel rotor pole; the lower layer is a flywheel lower annular layer which is in a shape of a circular ring, a lower annular groove is formed in a middle of the flywheel lower annular layer, and the annular inner groove, the middle-layer annular cavity, and the lower annular groove are communicated with each other and jointly used for placing the inner stator, the coil, and the permanent magnet of the five-degree-of-freedom magnetic bearing.

Further, the five-degree-of-freedom magnetic bearing comprises an axial magnetic bearing, a repulsive magnetic bearing, a torsional magnetic bearing, and a radial spherical magnetic bearing from inside to outside, and stator parts of the magnetic bearings constitute the inner stator of the five-degree-of-freedom magnetic bearing and are fixedly connected to a lower end cover of the shell.

Further, the axial magnetic bearing comprises an axial magnetic bearing stator, an axial permanent magnet, and an axial coil, the axial magnetic bearing stator is coaxially sheathed in the axial permanent magnet, the axial permanent magnet is magnetized radially and has an inner side as an N pole and an outer side as an S pole, an upper section of the axial magnetic bearing stator is an axial stator pole, the axial coil which is in a shape of a circular ring is wound on the axial stator pole, and the axial stator pole and the axial magnetic bearing stator are configured to be assembled to form a complete cylindrical shape; the axial permanent magnet is in a shape of a ring, and is tightly sheathed in the annular inner groove; the repulsive magnetic bearing comprises a repulsive magnetic bearing stator and two repulsive permanent magnets distributed coaxially, the repulsive magnetic bearing stator 21 is in a shape of a ring and is fixedly sleeved outside the axial magnetic bearing stator, an upper surface of the repulsive magnetic bearing stator is provided with an annular groove configured for mounting the repulsive permanent magnet therebelow, the repulsive permanent magnet is located exactly above and not in contact with the repulsive permanent magnet, the repulsive permanent magnet and the repulsive permanent magnet are both magnetized axially, and N poles of the repulsive permanent magnet and the repulsive permanent magnet are opposite to each other; an upper end surface of the repulsive permanent magnet is closely attached to a lower end surface of the flywheel rotor pole; the torsional magnetic bearing comprises a torsional magnetic bearing stator, three torsional control coils, and six torsional permanent magnets, the six torsional permanent magnets are all magnetized radially, and the three permanent magnets on an outer side have a same magnetization direction and each have an inner side as an N pole and an outer side as an S pole; the three permanent magnets on an inner side have a same magnetization direction and each have an inner side as an S pole and an outer side as an N pole, the torsional magnetic bearing stator is in a shape of a circular ring and is fixedly sleeved outside the repulsive magnetic bearing stator, three identical fan-shaped torsional stator poles are evenly arranged on an upper surface of the torsional magnetic bearing stator along a circumferential direction, torsional control coils are respectively wound on the torsional stator poles, and one torsional stator pole is arranged between each torsional permanent magnet on the inner side and the torsional permanent magnet on the outer side that is radially opposite to the each torsional permanent magnet; the three permanent magnets on the outer side are closely attached to an outer sidewall of the middle-layer annular cavity, and an inner ring of each of the three torsional permanent magnets on the inner side is closely attached to an outer ring of the flywheel rotor pole; the radial spherical magnetic bearing comprises a radial magnetic bearing stator and radial control coils, the radial magnetic bearing stator which is in a shape of a ring is fixedly sleeved outside the magnetic bearing stator, three identical radial stator poles extending radially outward are evenly arranged on an outer sidewall of the radial magnetic bearing stator along a circumferential direction, an outer sidewall of each of the radial stator poles is a part of a spherical surface, and the radial control coils are connected in series and are respectively wound on the radial stator poles in one-to-one correspondence.

Further, the axial flux motor consists of upper and lower motor rotors, a motor stator in a middle, upper and lower motor permanent magnets, and upper and lower motor coils, the motor stator is in the middle of the axial flux motor in an axial direction, and the axial flux motor is symmetrical about a middle section of the motor stator, and the motor stator is fixedly connected to a middle of an upper end cover of the shell by the motor bracket.

The present invention also provides an operating method of the ultra-thin vehicle-mounted magnetic suspension flywheel battery, comprising following steps:

step A: in a case of acceleration/deceleration or turning, driving the three radial control coils by a controller, to make the flywheel battery stable;

step B: in a case of driving uphill/downhill, driving the three radial control coils and the torsional control coils by the controller, to make the flywheel battery stable;

step C: in a case of driving on a bumpy road, driving the axial coil and the torsional control coils by the controller, to make the flywheel battery stable.

The present invention also provides an operating method of the ultra-thin vehicle-mounted magnetic suspension flywheel battery, wherein the flywheel is used as a rotor to implement mutual conversion between mechanical energy and electrical energy, and the method is divided into three stages: charging, energy retention, and discharging, wherein in the charging stage, the axial flux motor operates to drive the flywheel to rotate, and the flywheel stores electrical energy in a form of kinetic energy, to complete conversion from electrical energy to mechanical energy; in the energy retention stage, the flywheel maintains a constant speed; and in the discharging stage, the flywheel outputs energy to drive the axial flux motor to generate electricity, to complete conversion from mechanical energy to electrical energy.

Compared with the prior art, the present invention has the following beneficial effects:

1. To reduce the occupation of the axial space as much as possible, the present invention proposes an ultra-thin flywheel battery topology, which is a type of ultra-highly integrated "spindle-free" flywheel battery system, is of high integration, and can be more conveniently installed anywhere in a vehicle, thereby facilitating the popularization and application of the vehicle-mounted magnetic suspension flywheel battery system.

2. The diameter-to-height ratio of the spindle-free disc flywheel battery proposed by Chinese Patent Application No. 201910072060.7 entitled "Virtual-spindle magnetic suspension flywheel energy storage device for electric vehicles" is 3.5. The diameter-to-height ratio of the present invention is up to 5.2. As can be seen, even compared to conventional elongated and columnar flywheels with a lower diameter-to-height ratio, the present invention has a higher degree of integration and a higher critical rotational speed, and therefore has a higher energy storage capacity. Because the present invention does not include an inertia spindle, the solid flywheel has a higher form factor than that of a hollow structure, and therefore has a higher energy storage density.

3. The outside of the flywheel of the present invention is a smooth pure spherical envelope surface, which structure effectively weakens the gyroscopic effect, and increases the rotational speed, thereby improving the energy storage capacity. In addition, the flywheel is a pure metal flywheel with low costs, making the present invention cost-effective.

4. Compared to the structures of conventional vehicle-mounted flywheel batteries, to further adapt to the complex vehicle conditions and road conditions, supporting of the magnetic bearing in the present invention adopts the mode of using magnetic bearings with different properties in combination, involving several types of magnetic bearings including an axial magnetic bearing, a repulsive magnetic bearing, a torsional magnetic bearing, and a radial spherical magnetic bearing, to make full use of the advantages of these types of magnetic bearings to achieve a balance between the flywheel performance and the loss caused by the control coil under complex operating conditions. The surface of the stator pole of the radial spherical magnetic bearing is made spherical, which structure effectively suppresses the gyroscopic effect of the flywheel battery, and can effectively improve the stability of the flywheel battery. The axial magnetic bearing and the torsional magnetic bearing generate Lorentz forces and are of higher control precision, which can realize linear control and improve the system stability. In addition, the present invention balances the gravity of the flywheel by utilizing the principle of repulsion between the magnetic poles of the same polarity, to suspend the flywheel. This design not only reduces the loss caused by the control coil, but also can effectively reduce the impact force caused by the flywheel flying out due to failure, thereby improving the safety of the flywheel battery.

5. Different from conventional flywheel battery motors that adopt radial flux motors and are formed by lamination of silicon steel sheets, the motor in the present invention adopts an axial flux motor, and the stator of the motor is made of an amorphous alloy material, which can significantly reduce the iron loss of the motor and improve the efficiency of the motor. Because the flywheel motor usually operates at high speed and high frequency, the loss of the entire flywheel battery is greatly reduced, thereby achieving a better energy saving effect.

6. The shell of the present invention is made of a foamed aluminum material, which provides a strong sound insulation and noise reduction effect, and has the characteristics of small mass, strong energy absorption, high impact resistance, etc., and can effectively achieve safety protection for the flywheel battery. In addition, the vacuum environment formed by the highly sealed state can greatly reduce the loss caused by air friction, and can further increase the rotational speed of the flywheel, thereby improving the energy storage capacity and the system efficiency.

7. To further adapt to the application of the flywheel battery on the vehicle, the present invention proposes a multi-dimensional multi-space-time control method, to implement different control strategies for different vehicle driving conditions and road conditions. Through the reasonable combination of magnetic bearings with different properties and depending on whether the vehicle driving conditions and the road conditions are complex or not, the magnetic bearings are used in a time-sharing manner, to make use of the advantages of these bearings at the same time, which not only can improve the bearing capacity of the suspension magnetic bearing, improve the control precision, and significantly improve the stability of the flywheel, but also can effectively solve the problem of large loss of the control coil due to complex operating conditions, thereby achieving a balance between the flywheel performance and the loss caused by the control coil.

BRIEF DESCRIPTION OF THE DRAWINGS

The present invention will be further illustrated below through specific embodiments accompanied with figures.

Figure 1:
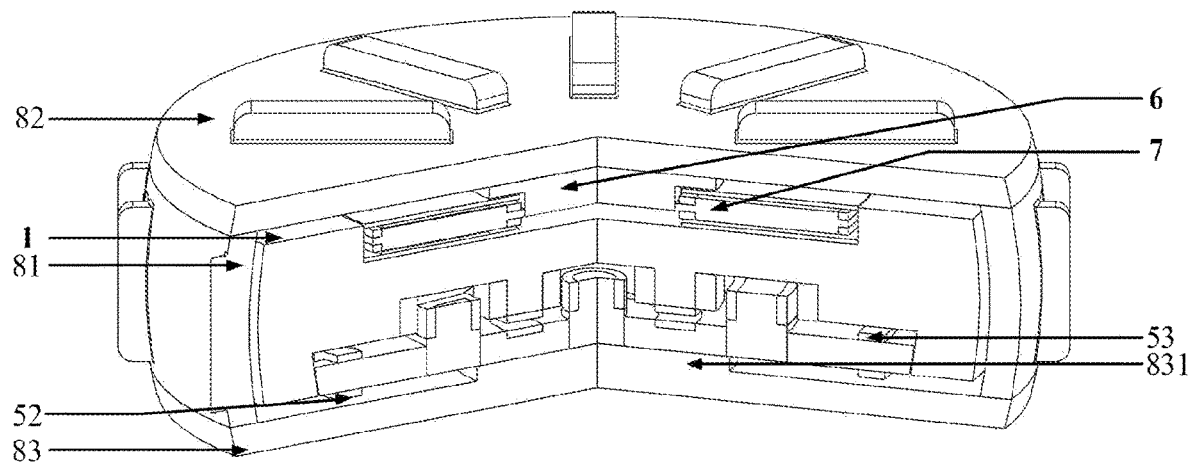
FIG. 1 is a cross-sectional view of an overall structure of the present invention.

In the drawings. 1. Flywheel; 6. Motor bracket; 7. Axial flux motor; 8. Vacuum shell; 11. Flywheel upper annular layer; 12. Flywheel middle layer; 13. Flywheel lower annular layer; 14. Upper annular groove of flywheel; 15. Annular inner groove of flywheel rotor pole; 16. Middle-layer annular cavity; 17. Lower annular groove of flywheel; 21. Repulsive magnetic bearing stator; 22. Repulsive permanent magnet; 23. Repulsive permanent magnet; 31. Axial magnetic bearing stator; 32. Axial permanent magnet; 33. Axial coil; 41. Torsional magnetic bearing stator; 42, 43, 44. Torsional control coil; 45, 46, 47, 48, 49, 410. Torsional permanent magnet; 51. Radial magnetic bearing stator; 52, 53, 54. Radial control coil; 71, 72. Motor rotor; 73. Motor stator; 74, 75. Motor permanent magnet; 76, 77. Motor coil; 81. Shell body; 82. Upper end cover; 83. Lower end cover; 121. Flywheel disc layer; 122. Flywheel double ring layer; 211. Annular groove of repulsive magnetic bearing stator; 311. Axial stator pole; 411, 412, 413. Torsional stator pole; 511, 512, 513. Radial stator pole; 731, 732. Motor stator pole; 733. Motor stator middle layer; 831. Bearing support frame; 811. Heat-dissipation fin of shell body; 812. Heat-dissipation groove; 821. Heat-dissipation fin of upper end cover; 1221. Flywheel rotor pole; 1222. Flywheel annular outer layer.

DETAILED DESCRIPTION OF THE EMBODIMENTS

Figure 2:
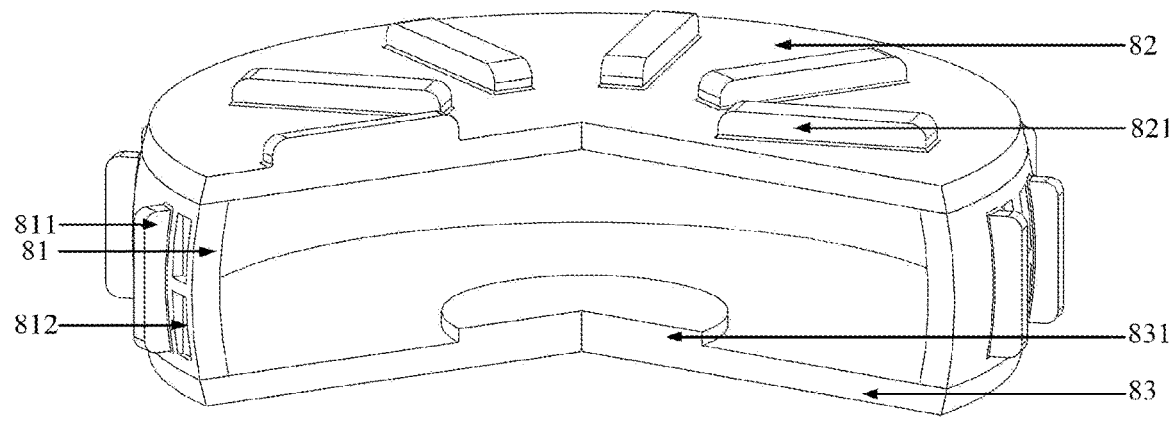
FIG. 2 is a structural view of a shell in FIG. 1.

Referring to FIG. 1 and FIG. 2, the outermost part of the present invention is a shell. The shell consists of a shell body 81, an upper end cover 82, and a lower end cover 83 sealedly connected to each other, and is made of foamed aluminum. An upper end of the shell body 81 is tightly and fixedly connected to the upper end cover 82, a lower end of the shell body 81 is tightly and fixedly connected to the lower end cover 83, and a sealed vacuum chamber is defined by the shell body 81, the upper end cover 82, and the lower end cover 83 to reduce air friction loss. The shell body 81 is a hollow partial-spherical shell, and is provided with heat-dissipation fins 811 and heat-dissipation grooves 812 on an outer circumferential surface thereof. The heat-dissipation fins 811 are elongated and columnar, and diametrically protrude outward from the outer circumferential surface of the shell body 81. The heat-dissipation grooves 812 are rectangular grooves, openings of which face toward the outside diametrically. Every four heat-dissipation fins 811 arranged in a rectangular array form a group. Along the circumferential direction, two heat-dissipation grooves 812 are symmetrically arranged at intervals on two sides of the four heat-dissipation fins 811. The upper end cover 82 is in a shape of a solid disc, and is provided on an upper surface thereof with eight elongated and columnar heat-dissipation fins 821 evenly arranged along the circumferential direction. The elongated and columnar cylindrical fins 821 extend diametrically. The lower end cover 83 is in a shape of a solid disc. A disc-shaped bearing support frame 831 protrudes coaxially toward the inside of the shell from a center of an upper surface of the lower end cover 83, and is configured to support a magnetic bearing and fixedly connect to an inner stator part of the magnetic bearing.

Inside the vacuum chamber of the shell, a motor bracket 6, an axial flux motor 7, a flywheel 1, and an inner stator, a coil, and a permanent magnet of a five-degree-of-freedom magnetic bearing are coaxially arranged from top to bottom. The flywheel 1 acts as an outer rotor of the five-degree-of-freedom magnetic bearing.

Figure 3:
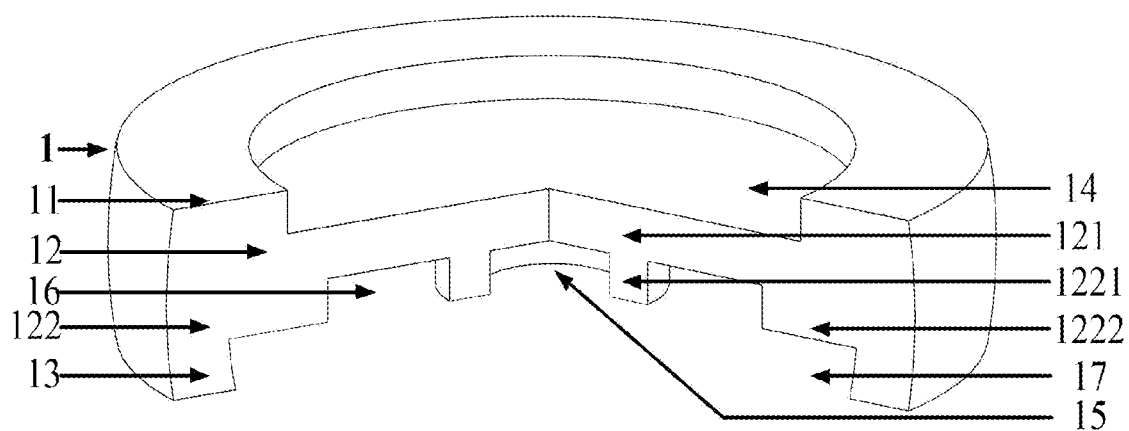
FIG. 3 is a structural enlarged view of the flywheel 1 in FIG. 1.
Figure 4:
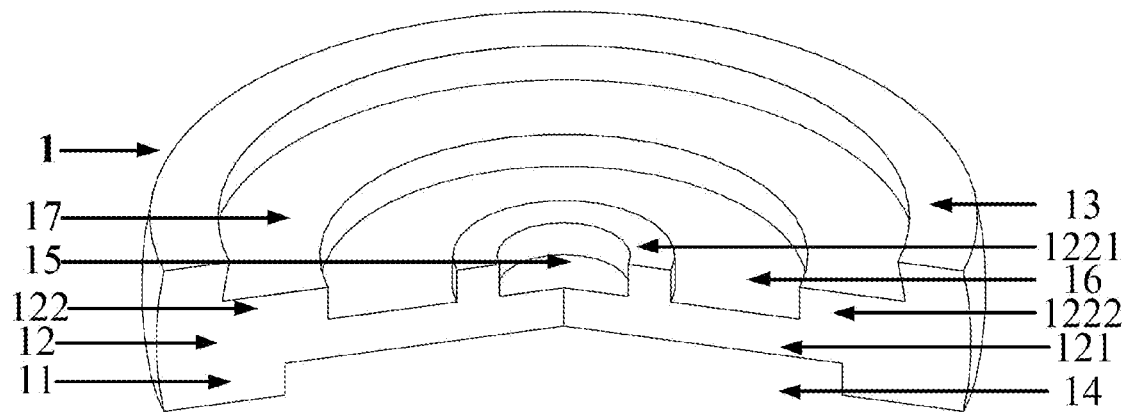
FIG. 4 is an axonometric bottom view of the flywheel 1 in FIG. 3.

Referring to a structure of the flywheel 1 shown in FIG. 3 and FIG. 4, the flywheel 1 is generally a middle section of a sphere, and is a spindle-free structure as a whole, of which an outer sidewall is a smooth spherical envelope surface. The flywheel 1 consists of an upper layer, a middle layer, and a lower layer which are continuous. The upper layer is a flywheel upper annular layer 11, the middle layer is a flywheel middle layer 12, and the lower layer is a flywheel lower annular layer 13. The flywheel upper annular layer 11 is in a shape of a circular ring. An upper annular groove 14 is formed in a middle of the flywheel upper annular layer 11. The upper annular groove 14 is a space reserved for installation of the axial flux motor 7. The axial flux motor 7 is placed in the upper annular groove 14. The flywheel middle layer 12 includes a flywheel disc layer 121 and a flywheel double ring layer 122 below the flywheel disc layer 121. Wherein, the flywheel disc layer 121 is in a shape of a solid disc, the flywheel double ring layer 122 consists of an annular flywheel rotor pole 1221 and a flywheel annular outer layer 1222 coaxially distributed with respect to a central axis, and a lower end surface of the annular flywheel rotor pole 1221 is flush with a lower end surface of the flywheel annular outer layer 1222. The flywheel rotor pole 1221 is in a shape of a circular ring concentrically protruding downward from a middle of a lower surface of the flywheel disc layer 121. An annular inner groove 15 is formed in a middle of the flywheel rotor pole 1221. The annular inner groove 15 is configured for accommodating and installing the permanent magnet, coil, and stator pole parts of the axial magnetic bearing. The flywheel annular outer layer 1222 is in a shape of a circular ring, of which an outer circumference is a smooth spherical envelope surface. An inner diameter of the flywheel annular outer layer 1222 is smaller than an inner diameter of the flywheel upper annular layer 11 and larger than an outer diameter of the flywheel rotor pole 1221. Therefore, a middle-layer annular cavity 16 is formed between an inner wall of the flywheel annular outer layer 1222 and an outer wall of the flywheel rotor pole 1221. The middle-layer annular cavity 16 is configured for accommodating and installing the permanent magnet, coil, and stator pole parts of the torsional magnetic bearing. The flywheel lower annular layer 13 is in a shape of a circular ring, of which an inner diameter is larger than the inner diameter of the flywheel upper annular layer 11. A lower annular groove 17 is formed in a middle of the flywheel lower annular layer 13. The lower annular groove 17 in the middle is configured for accommodating permanent magnet and stator parts of the repulsive magnetic bearing, coil and stator parts of the radial magnetic bearing, a stator bottom of the axial magnetic bearing, and a stator bottom of the torsional magnetic bearing. A lower surface of the flywheel lower annular layer 13 is lower than a lower surface of the flywheel annular outer layer 1222, so that the flywheel lower annular layer 13 and the flywheel annular outer layer 1222 form a step-like shape. The middle-layer annular cavity 16 and the lower annular groove 17 are fully communicated with each other to form a step-like space. The annular inner groove 15, the middle-layer annular cavity 16, and the lower annular groove 17 are communicated with each other and jointly used for placing the inner stator, the coil, and the permanent magnet of the five-degree-of-freedom magnetic bearing. The annular inner groove 15, the middle-layer annular cavity 16, and the lower annular groove 17 are not communicated with the upper annular groove 14, and are separated from the upper annular groove 14 by the solid disc-shaped flywheel disc layer 121. Except for the spaces of the upper annular groove 14, the annular inner groove 15, the middle-layer annular cavity 16, and the lower annular groove 17, the flywheel 1 is integral.

In the present invention, to design an ultra-thin vehicle-mounted flywheel battery, a diameter-to-height ratio of the flywheel 1 is 5.2, which is the ratio of a maximum diameter of the flywheel middle layer 12 to a height between an upper surface of the flywheel upper annular layer 11 and the lower surface of the flywheel lower annular layer 13.

Figure 5:
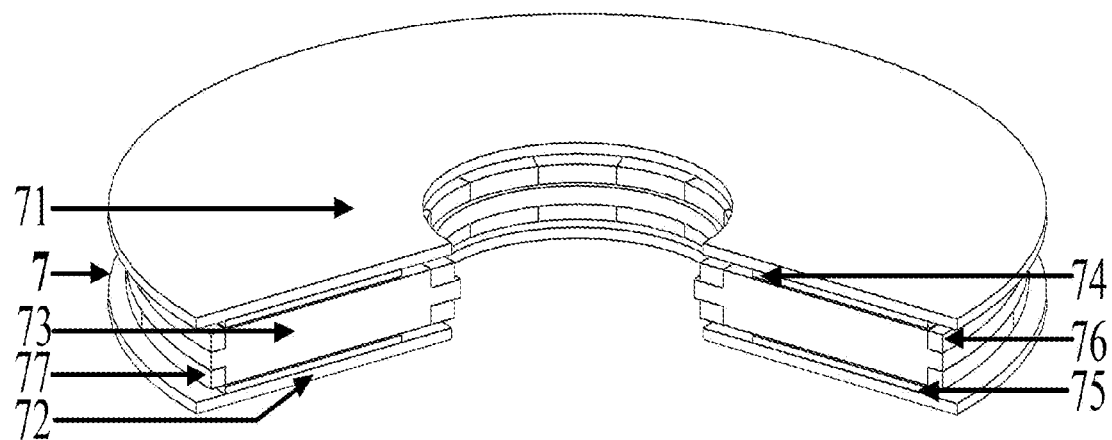
FIG. 5 is an enlarged view of an overall structure of the axial flux motor 7 in FIG. 1.
Figure 6:
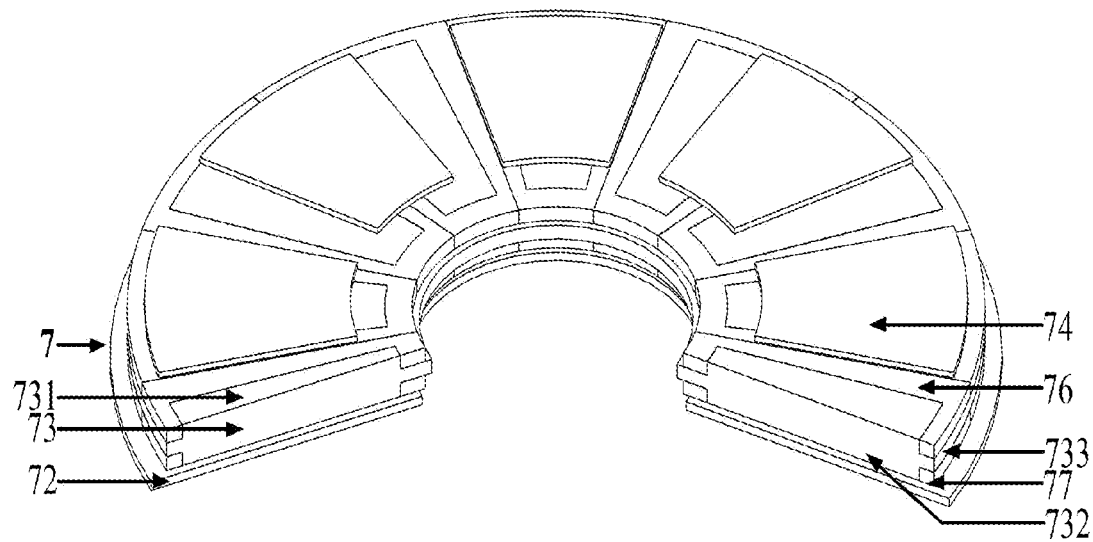
FIG. 6 is a structural view of the structure in FIG. 5 after the motor rotor 71 is removed.

Referring to FIG. 1 and in conjunction with the axial flux motor 7 shown in FIG. 5 and FIG. 6, the axial flux motor 7 is designed as a double-rotor single-stator structure and is coaxially installed in the upper annular groove 14 of the upper annular layer 11 of the flywheel 1, where the stator is made of an amorphous alloy material. The axial flux motor 7 consists of upper and lower motor rotors 71 and 72, a motor stator 73 in a middle, upper and lower motor permanent magnets 74 and 75, and identical upper and lower motor coils 76 and 77. The motor stator 73 is in the middle of the axial flux motor 7 in an axial direction, and the axial flux motor 7 is symmetrical about a middle section of the motor stator 73.

In the axial direction, the axial flux motor 7 includes, from top to bottom, the upper motor rotor 71, the upper motor permanent magnet 74, the upper motor coil 76, the motor stator 73, the lower motor coil 77, the lower motor permanent magnet 75, and the lower motor rotor 72, which are coaxially distributed. Wherein, the upper and lower motor rotors 71 and 72 are identical, are both ring-shaped, and are symmetrical about the middle section of the motor stator 73, the motor stator 73 is of a continuous three-layer structure including an upper layer, a motor stator middle layer 733, and a lower layer, wherein the upper layer includes twelve motor stator poles 731 arranged at equal intervals along a circumferential direction for winding twelve upper motor coils 76, the motor stator middle layer 733 is in a shape of a circular ring, and the lower layer includes twelve motor stator poles 732 arranged at equal intervals along the circumferential direction, for winding twelve lower motor coils 77. The motor stator poles 731 of the upper layer and the motor stator poles 732 of the lower layer are identical, are all fan-shaped, and are vertically symmetrical about the middle section of the motor stator 73 (i.e., the motor stator middle layer 733) in the axial direction. The upper and lower motor permanent magnets 74 and 75 are identical, are all fan-shaped, and are vertically symmetrical about the middle section of the motor stator 73 (i.e., the motor stator middle layer 733). The upper motor coils 76 and the lower motor coils 77 are of the same structure.

An outer diameter of the upper motor rotor 71 and an outer diameter of the lower motor rotor 72 are larger than an outer diameter of the motor stator middle layer 733. The outer diameter of the motor stator middle layer 733 is larger than outer diameters of the upper and lower motor permanent magnets 74 and 75. The outer diameters of the upper and lower motor permanent magnets 74 and 75 are larger than an outer diameter of the motor stator pole 731. The upper and lower motor permanent magnets 74 and 75, the motor stator poles 731, the upper and lower motor rotors 71 and 72, and the motor stator middle layer 733 are in descending order of inner diameters.

In addition, eight fan-shaped upper and lower motor permanent magnets 74 and 75 are evenly arranged along the circumferential direction respectively, and are closely attached to the upper and lower motor rotors 71 and 72 respectively. Wherein, the eight upper motor permanent magnets 74 are closely attached and fixed to a lower bottom surface of the upper motor rotor 71, the eight upper motor permanent magnets 75 are closely attached and fixed to an upper bottom surface of the lower motor rotor 72, and the upper and lower motor permanent magnets 74 and 75 are symmetrical about the middle section of the motor stator 73 in the axial direction. The upper and lower motor permanent magnets 74 and 75 are not in contact with the upper and lower motor coils 76 and 77. The motor stator 73 is respectively spaced apart from the upper and lower motor permanent magnets 74 and 75 by a spacing of 0.5 mm in the axial direction.

The outer diameters of the upper and lower motor rotors 71 and 72 are equal to the inner diameter of the upper annular layer 11 of the flywheel 1, i.e., equal to a diameter of the upper annular groove 14. The upper and lower motor rotors 71 and 72 are tightly and fixedly connected to the upper annular groove 14. An upper surface of the upper motor rotor 71 is flush with an upper surface of the upper annular groove 14, and the lower motor rotor 72 is closely attached and fixed to a bottom groove surface of the upper annular groove 14.

Figure 7:
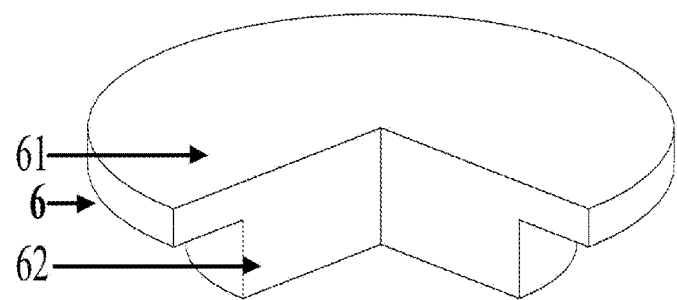
FIG. 7 is a structural enlarged view of the motor bracket 6 in FIG. 1.

Referring to FIG. 1 and FIG. 7, the motor stator 73 is coaxially sleeved outside the motor bracket 6, and is fixedly connected to the motor bracket 6. The motor bracket 6 is also fixedly connected to a middle of the upper end cover 82. The motor bracket 6 is a stepped shaft structure, including an upper section which is an upper-layer disc 61 with a larger outer diameter and a lower section which is a lower-layer disc 62 with a smaller outer diameter. The inner diameter of the motor stator middle layer 733 is equal to the outer diameter of the lower-layer disc 62. The motor stator middle layer 733 is coaxially fixedly sleeved outside the lower-layer disc 62. An inner ring of the motor stator middle layer 733 is fixedly connected to an outer ring of the lower-layer disc 62 of the motor bracket 6, to fix the motor stator 73 and the motor bracket 6. The upper-layer disc 61 is fixedly connected to a middle of a bottom of the upper end cover 82, to achieve the tight fixation of the axial flux motor 7. The motor bracket 6 is not in contact with the upper and lower motor rotors 71 and 72, the motor permanent magnets 74 and 75, and the motor coils 76 and 77.

Figure 8:
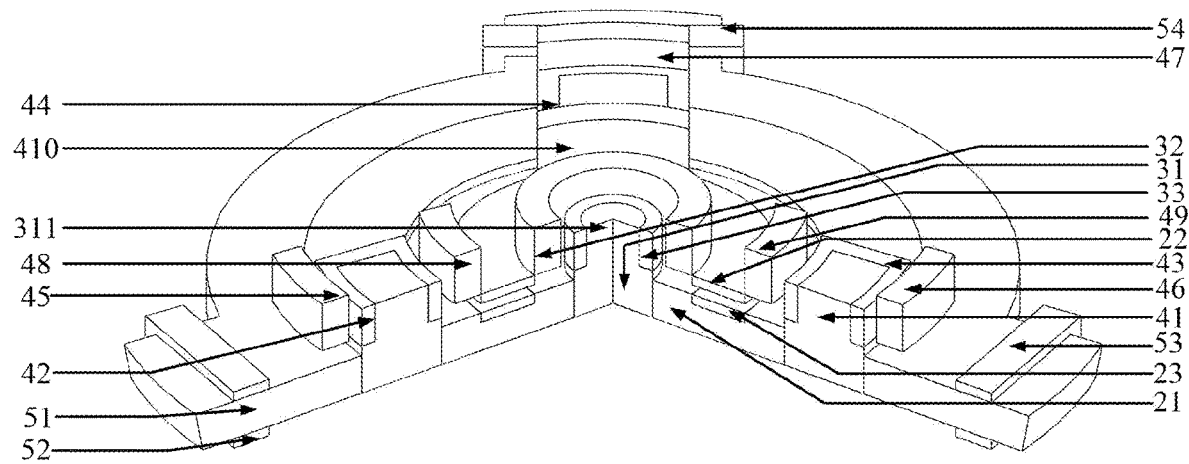
FIG. 8 is an enlarged view of an overall structure of the five-degree-of-freedom magnetic bearing in FIG. 1.

Referring to FIG. 8 and FIG. 1, the five-degree-of-freedom magnetic bearing is located between the flywheel 1 and the lower end cover 82, and shares a set of magnetic bias circuit. For the convenience of description, the five-degree-of-freedom magnetic bearing is divided into four parts coaxially distributed according to functions of magnetic bearings, which are an axial magnetic bearing, a repulsive magnetic bearing, a torsional magnetic bearing, and a radial spherical magnetic bearing from inside to outside, and are respectively configured for high precision control of a single axial degree of freedom, gravity balance of the flywheel, high precision control of two torsional degrees of freedom, and control of two radial degrees of freedom. The four parts include a stationary part and a rotary part. The stationary part includes a repulsive magnetic bearing stator 21, a repulsive permanent magnet 23, an axial magnetic bearing stator 31, an axial coil 33, a torsional magnetic bearing stator 41, torsional control coils 42, 43, and 44, a radial magnetic bearing stator 51, radial control coils 52, 53, and 54, etc. The stationary part is connected to the lower end cover 83 by fitting. The rotary part includes a repulsive permanent magnet 22, an axial permanent magnet 32, torsional permanent magnets 45, 46, 47, 48, 49, and 410, etc., which are all embedded in a lower part of the flywheel 1. In addition, the stationary part and the rotary part of the five-degree-of-freedom magnetic bearing are not in contact with each other. Stator parts of the axial magnetic bearing, the repulsive magnetic bearing, the torsional magnetic bearing, and the radial spherical magnetic bearing are fixedly connected together, to jointly form the inner stator of the five-degree-of-freedom magnetic bearing. The inner stator is fixedly connected to the bearing support frame 831 of the lower end cover 83.

Figure 9:
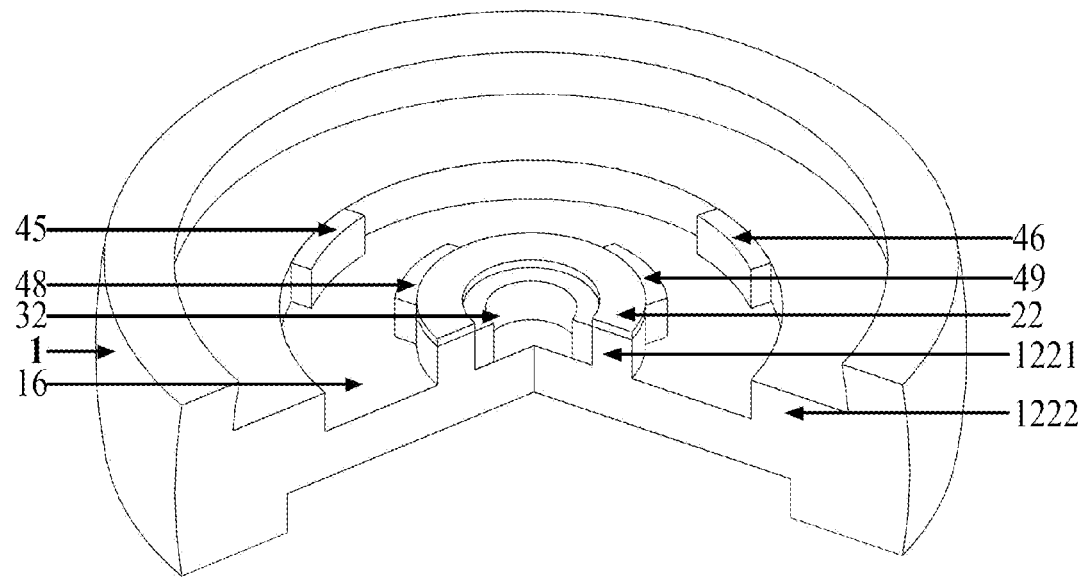
FIG. 9 is an assembled view of the flywheel 1 and the rotary part of the five-degree-of-freedom magnetic bearing in FIG. 8.
Figure 10:
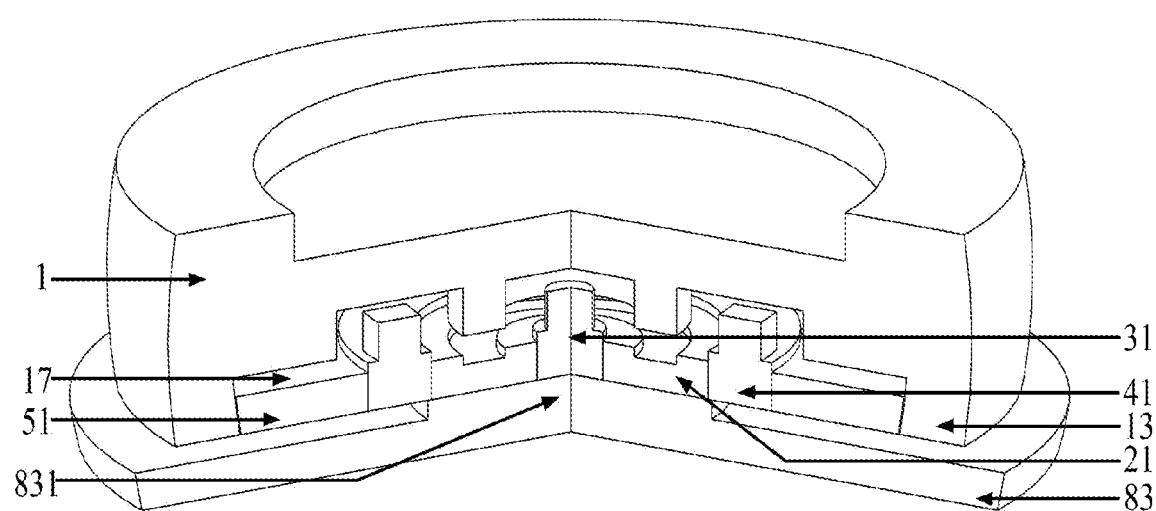
FIG. 10 is an assembled view of the flywheel 1 and the stator of the five-degree-of-freedom magnetic bearing.
Figure 11:
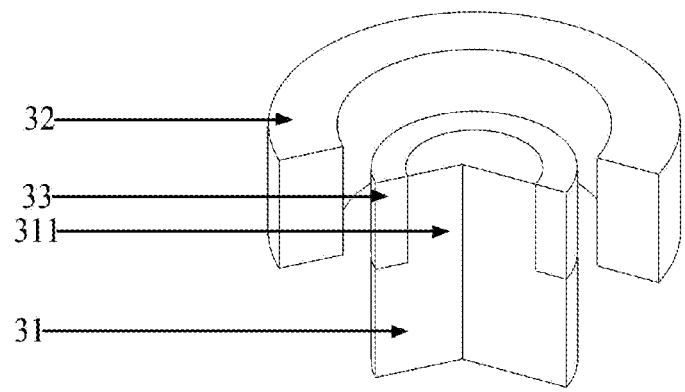
FIG. 11 is a schematic structural enlarged view of the axial magnetic bearing part of the five-degree-of-freedom magnetic bearing in FIG. 8.

The structures and assembly of various parts of the five-degree-of-freedom magnetic bearing are further described below. Referring to FIG. 9, the assembly of the flywheel 1 and the rotary part of the five-degree-of-freedom magnetic bearing is shown. The axial permanent magnet 32 is in a shape of a ring, and is tightly sheathed in the annular inner groove 15 in the middle of the flywheel rotor pole 1221. An outer diameter of the axial permanent magnet 32 is equal to a diameter of the annular inner groove 15, an outer ring of the axial permanent magnet 32 is closely attached and fixed to the annular inner groove 15, and upper and lower end surfaces of the axial permanent magnet 32 are flush with upper and lower end surfaces of the flywheel rotor pole 1221 respectively. The repulsive permanent magnet 22 is in a shape of a ring, of which inner and outer diameters are respectively equal to inner and outer diameters of the flywheel rotor pole 1221. An upper end surface of the repulsive permanent magnet 22 is closely attached and fixed to the lower end surface of the flywheel rotor pole 1221. The three torsional permanent magnets 45, 46, and 47 are identical, are each a part of a ring, and are arranged in the middle-layer annular cavity 16. Outer diameters of the torsional permanent magnets 45, 46, and 47 are equal to the inner diameter of the middle-layer annular cavity 16. The three outer torsional permanent magnets 45, 46, and 47 are evenly arranged along the circumferential direction, and are closely attached to an outer sidewall of the middle-layer annular cavity 16, i.e., outer rings of the three outer torsional permanent magnets 45, 46, and 47 are closely attached and fixed to the inner ring of the flywheel annular outer layer 1222. Heights of the three outer torsional permanent magnets 45, 46, and 47 are equal to a height of the middle-layer annular cavity 16, and upper and lower surfaces the three outer torsional permanent magnets 45, 46, and 47 are flush with upper and lower surfaces of the middle-layer annular cavity 16 respectively. Three identical torsional permanent magnets 48, 49, and 410 are arranged on an inner side of the three outer torsional permanent magnets 45, 46, and 47. The outer torsional permanent magnets 45, 46, and 47 are radially opposite to the torsional permanent magnets 48, 49, and 410 on the inner side in one-to-one correspondence, to form three pairs of permanent magnets in the radial direction. The torsional permanent magnets 45, 46, 47, 48, 49, and 410 are not in contact with each other. The three torsional permanent magnets 48, 49, and 410 on the inner side are each a part of a ring, and are arranged in the middle-layer annular cavity 16. Inner diameters of the three torsional permanent magnets 48, 49, and 410 on the inner side are equal to the outer diameter of the flywheel rotor pole 1221, i.e., an inner diameter of the middle-layer annular cavity 16. The three torsional permanent magnets 48, 49, and 410 on the inner side are evenly distributed along the circumferential direction. Inner rings of the three torsional permanent magnets 48, 49, and 410 on the inner side are closely attached and fixed to an outer ring of the flywheel rotor pole 1221, upper and lower surfaces the three torsional permanent magnets 48, 49, and 410 on the inner side are flush with the upper and lower surfaces of the flywheel rotor pole 1221 respectively. To further describe the assembly requirements of the five-degree-of-freedom magnetic bearing, the magnetic bearings are described below respectively. Referring to FIG. 8 and FIG. 11, the axial magnetic bearing includes an axial magnetic bearing stator 31, an axial permanent magnet 32, and an axial coil 33. The axial magnetic bearing stator 31 is coaxially sheathed in the axial permanent magnet 32. The axial permanent magnet 32 is magnetized radially, and has an inner side as an N pole and an outer side as an S pole.

The axial magnetic bearing stator 31 is a solid stepped shaft structure, where an upper section of the stepped shaft structure is a shaft with a smaller outer diameter. The upper section of the stepped shaft structure is the axial stator pole 311, for winding axial coils 33 which are circular ring-shaped. An outer diameter of the axial coil 33 is equal to an outer diameter of a lower section of the axial magnetic bearing stator 31, i.e., the axial stator pole 311 and the axial magnetic bearing stator 31 are assembled to form a complete cylindrical shape. An upper end surface of the axial coil 33 is flush with an upper end surface of the axial stator pole 311, and lower end surfaces of the axial permanent magnet 32 and the axial coil 33 are flush with a lower end surface of the axial stator pole 311. The axial permanent magnet 32 is not in contact with the axial magnetic bearing stator 31 and the axial coil 33.

Figure 12:
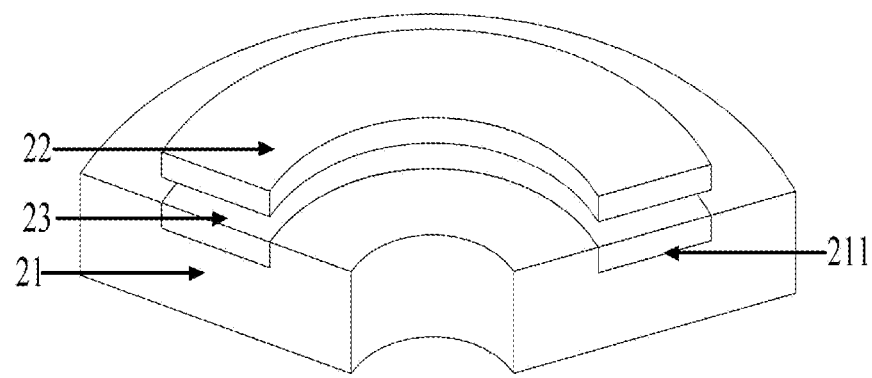
FIG. 12 is a schematic structural enlarged view of the repulsive magnetic bearing part of the five-degree-of-freedom magnetic bearing in FIG. 8.

Referring to FIG. 8 and FIG. 12, the repulsive magnetic bearing includes a repulsive magnetic bearing stator 21 and two repulsive permanent magnets 22 and 23, which are all distributed concentrically. The repulsive magnetic bearing stator 21 is in a shape of a ring, of which an inner diameter of an inner ring is equal to the outer diameter of the axial magnetic bearing stator 31; and is fixedly sleeved outside the axial magnetic bearing stator 31, so that the repulsive magnetic bearing stator 21 and the axial magnetic bearing stator 31 are fixedly connected together. An upper surface of the repulsive magnetic bearing stator 21 is provided with an annular groove 211 configured for mounting the repulsive permanent magnet 23. The repulsive permanent magnet 23 is placed in the annular groove 211. The repulsive permanent magnet 23 and the annular groove 211 are of the same size. The repulsive permanent magnet 23 is identical to the repulsive permanent magnet 22. Inner and outer diameters of the repulsive permanent magnet 23 are respectively equal to inner and outer diameters of the annular groove 211. Upper and lower end surfaces of the repulsive permanent magnet 23 are flush with upper and lower end surfaces of the annular groove 211 respectively, so that the repulsive permanent magnet 23 is embedded exactly in the annular groove 211. The repulsive permanent magnet 22 is located exactly above the repulsive permanent magnet 23, and is not in contact with the repulsive magnetic bearing stator 21 and the repulsive permanent magnet 23. The repulsive permanent magnets 22 and 23 are both magnetized axially, but with opposite magnetization directions. N poles of the repulsive permanent magnet 22 and the repulsive permanent magnet 23 are opposite to each other, i.e., the N pole of the repulsive permanent magnet 22 faces downward, and the N pole of the repulsive permanent magnet 23 faces upward. The repulsive magnetic bearing stator 21 is located exactly above the bearing support frame 831, and is fixedly connected to the bearing support frame 831.

Figure 13:
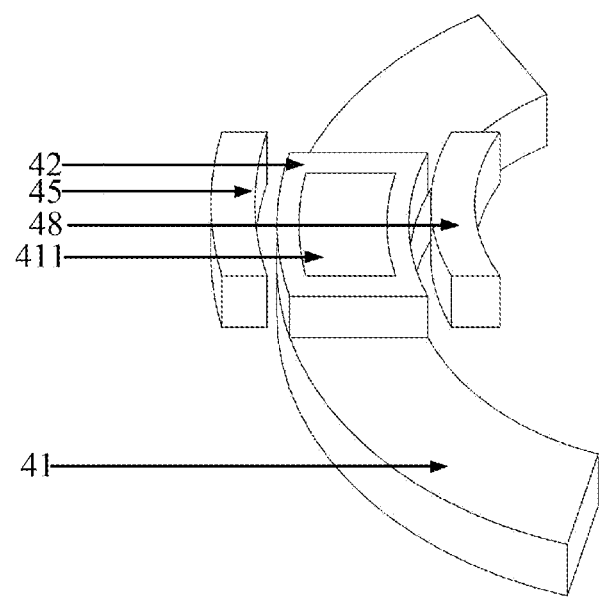
FIG. 13 is a schematic structural enlarged view of the torsional magnetic bearing part of the five-degree-of-freedom magnetic bearing in FIG. 8.

Referring to FIG. 8 and FIG. 13, the torsional magnetic bearing includes a torsional magnetic bearing stator 41, three torsional control coils 42, 43, and 44, and six torsional permanent magnets 45, 46, 47, 48, 49, and 410. The six torsional permanent magnets 45, 46, 47, 48, 49, and 410 are all magnetized radially. Wherein, the three permanent magnets 45, 46, and 47 on an outer side have a same magnetization direction and each have an inner side as an N pole and an outer side as an S pole; the three permanent magnets 48, 49, and 410 on an inner side have a same magnetization direction and each have an inner side as an S pole and an outer side as an N pole. Wherein, the torsional magnetic bearing stator 41 is in a shape of a circular ring, of which an inner diameter is equal to an outer diameter of the repulsive magnetic bearing stator 21; and is fixedly sleeved outside the repulsive magnetic bearing stator 21, so that the torsional magnetic bearing stator 41 and the repulsive magnetic bearing stator 21 are fixedly connected together. Three identical fan-shaped torsional stator poles 411, 412, and 413 are evenly arranged on an upper surface of the torsional magnetic bearing stator 41 along a circumferential direction, and are configured for winding the torsional control coils 42, 43, and 44 respectively. Upper end surfaces of the torsional stator poles 411, 412, and 413 are flush with the upper end surface of the axial stator poles 311, and are respectively arranged between the corresponding torsional permanent magnets 45, 48, 46, 49, 47 and 410, i.e., one torsional stator pole 411, 412, 413 is arranged between each torsional permanent magnet 48, 49, 410 on the inner side and the torsional permanent magnet 45, 46, 47 on the outer side that is radially opposite to the each torsional permanent magnet 48, 49, 410. In addition, the six torsional permanent magnets 45, 46, 47, 48, 49, and 410 are not in contact with the torsional magnetic bearing stator 41 and the torsional control coils 42, 43, and 44, and the torsional magnetic bearing stator 41 is located exactly below a position between the three permanent magnets 45, 46, and 47 on the outer side and the three permanent magnets 48, 49, and 410 on the inner side.

Figure 14:
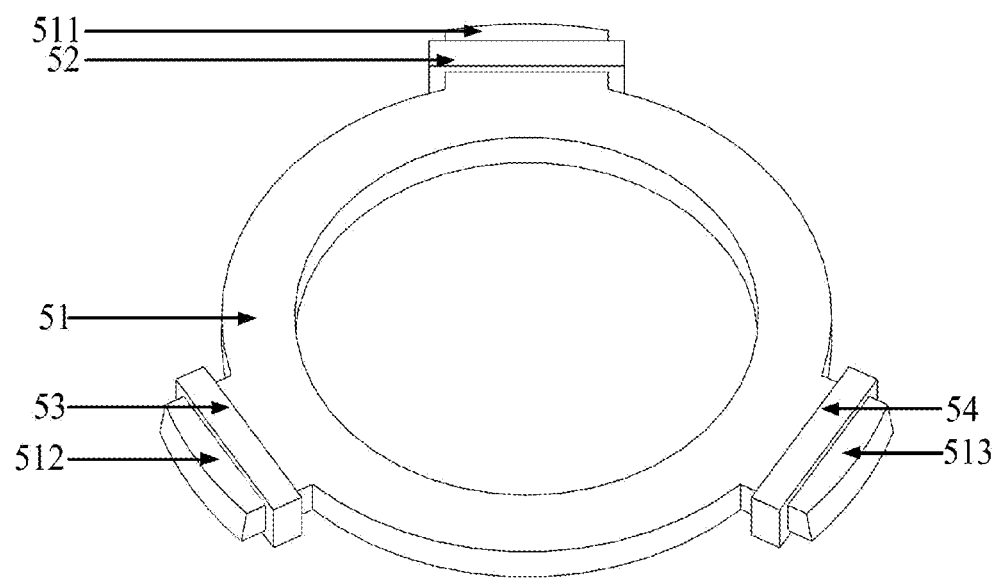
FIG. 14 is a schematic structural enlarged view of the radial magnetic bearing part of the five-degree-of-freedom magnetic bearing in FIG. 8.

Referring to FIG. 8 and FIG. 14, the radial spherical magnetic bearing includes a radial magnetic bearing stator 51 and radial control coils 52, 53, and 54. Wherein, the radial magnetic bearing stator 51 is in a shape of a ring, of which an inner diameter is equal to an outer diameter of the torsional magnetic bearing stator 41; and is fixedly sleeved outside the magnetic bearing stator 41. An upper end surface of the radial magnetic bearing stator 51 is flush with an upper end surface of the repulsive magnetic bearing stator 21. Three identical radial stator poles 511, 512, and 513 are evenly arranged on an outer sidewall of the radial magnetic bearing stator 51 along a circumferential direction. The radial magnetic bearing stator 51 may extend radially outward to form the radial stator poles 511, 512, and 513. An outer sidewall of each of the radial stator poles 511, 512, and 513 is a part of a spherical surface. Upper and lower end surfaces of the radial stator poles 511, 512, and 513 are flush with upper and lower end surfaces of a yoke of the radial magnetic bearing stator 51 respectively. The radial control coils 52, 53, and 54 are connected in series, and are respectively wound on the radial stator poles 511, 512, and 513 in one-to-one correspondence. Because the bearing support frame 831 protrudes upward toward the inside of the shell, a winding space is reserved for the radial coils 52, 53, and 54, so that the radial coils 52, 53, and 54 are not in contact with the lower end cover 83.

During operation of the flywheel battery of the present invention, the flywheel 1 rotating at a high speed is used as a rotor to implement mutual conversion between mechanical energy and electrical energy. The process is divided into three stages, charging, energy retention, and discharging. Details are given as follows.

(1) Charging stage: The axial flux motor 7 is in a motor operating state. The axial flux motor 7 drives the flywheel 1 to accelerate its rotation, and the flywheel 1 stores electrical energy in a form of kinetic energy, to complete conversion from electrical energy to mechanical energy, thereby realizing the input and storage of electrical energy.

(2) Energy retention stage: In this stage, the flywheel battery is in a fully charged state. The flywheel 1 is almost maintained at a constant rotational speed. This stage continues until the flywheel battery receives an energy release control signal. In this stage, no energy conversion occurs, and neither charging nor discharging is involved.

(3) Discharging stage: The axial flux motor 7 is in a generator state. The flywheel 1 rotating at a high speed outputs energy. The axial flux motor 7 is driven to generate electricity, and outputs appropriate electrical energy through a power electronic converter, thus completing conversion from mechanical energy to electrical energy. During the operation of the flywheel battery, regardless of the operating status of the flywheel 1, the present invention has good stability.

In the present invention, the combination of electromagnetic force magnetic bearings and Lorentz force magnetic bearings with different properties is applied to the vehicle-mounted flywheel battery. Through the reasonable combination of magnetic bearings with different properties to make full use of the advantages of these types of magnetic bearings, static passive suspension, control of two radial degrees of freedom, high-precision control of two torsional degrees of freedom, and high-precision control of a single axial degree of freedom of the flywheel 1 are realized, to meet the requirements of the vehicle-mounted flywheel battery for stability, low loss, and control precision. Specific implementations areas follows.

Figure 15:
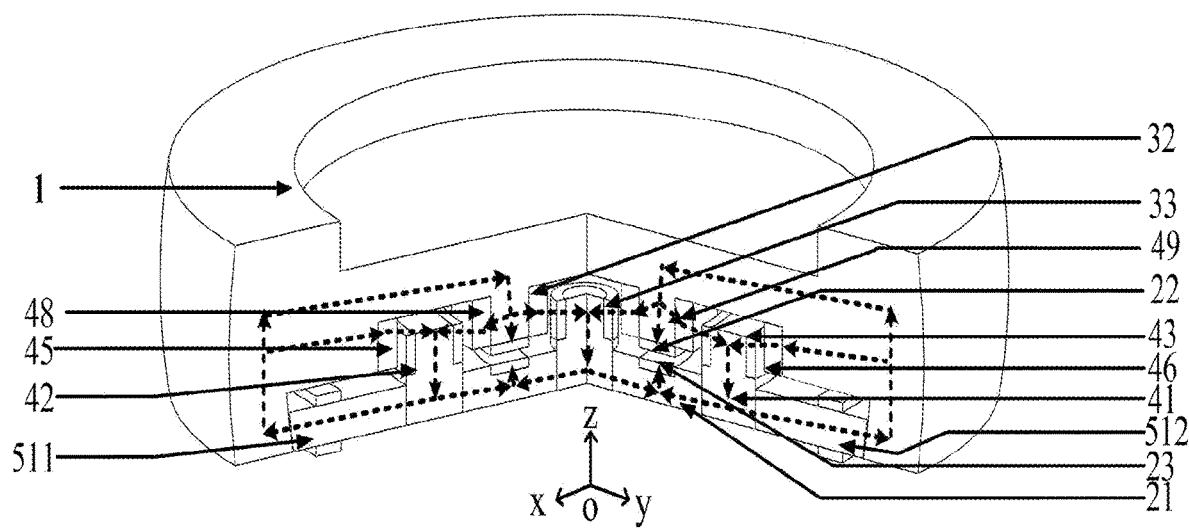
FIG. 15 is a principle diagram showing static passive suspension of the flywheel 1 under the action of the five-degree-of-freedom magnetic bearing.

Implementation of static passive suspension: As shown in FIG. 15, the central axis of the flywheel 1 is represented by Z axis, and radials direction of the flywheel 1 are represented by X axis and Y axis. A magnetic bias flux generated by the axial permanent magnet 32 flows from the N pole of the axial permanent magnet 32, passes through the axial coil 33 and the axial magnetic bearing stator 31, and finally reaches the S pole of the repulsive permanent magnet 23 embedded in the repulsive magnetic bearing stator 21. Magnetic bias fluxes generated by the pairs of the torsional permanent magnets 45, 48, 46, 49, 47, and 410 respectively flow from the N poles of the torsional permanent magnets 45, 48, 46, 49, 47, and 410, pass through the corresponding torsional coils 42, 43, and 44, converge in the torsional magnetic bearing stator 41, and are divided into two paths. One path reaches the S pole of the repulsive permanent magnet 23. The other path passes through the radial magnetic bearing stator 51 and is divided into three paths, which pass through the radial stator poles 511, 512, and 513, pass through radial spherical air gaps respectively, reach the flywheel 1, and are further divide into multiple paths, which reach the S poles of the repulsive permanent magnet 22, the axial permanent magnet 32, and the torsional permanent magnets 45, 46, 47, 48, 49, and 410, respectively, thus forming a complete magnetic bias circuit.

The repulsive permanent magnets 22 and 23 of the repulsive magnetic bearing are both magnetized axially, and are of opposite polarities. When the flywheel 1 is at a central balanced position, the electromagnetic repulsive force generated by the flywheel 1 offsets the gravity of the flywheel 1. Conventional flywheel batteries where an electromagnetic attraction force in a direction opposite to that of the flywheel gravity is used to balance the gravity have the following problems: when the flywheel is disturbed and deviated upward, the air gap decreases, the air-gap flux increases, and the electromagnetic force increases, leading to a large deviation of the flywheel. The present invention uses a magnetic repulsive force to balance the gravity, and makes use of the self-balancing mechanism of the repulsive magnetic bearing, to reduce the impact of disturbance, thereby greatly reducing the loss caused by the control coil. In addition, air-gap fluxes between the flywheel 1 and the radial stator poles 511, 512, and 513 are equal, so that forces received by the flywheel 1 are balanced, and the flywheel 1 is at a radial balanced position, thereby realizing static passive suspension of the flywheel 1 during rotation. Moreover, the radial magnetic bearing is a spherical centripetal magnetic bearing, and each of the three radial spherical stator poles 511, 512, and 513 is separated from the inner wall of the flywheel 1 by a radial spherical air gap of 0.5 mm. Such a structure effectively suppresses the gyroscopic effect of the flywheel battery, and can effectively improve the stability of the flywheel battery.

According to the Lorentz force equation F=BIL, where B is a magnetic induction intensity, 1 is an intensity of a control current, and L is a length of a control coil in a magnetic field, a control current may be applied to a control coil of a Lorentz force magnetic bearing. Under the action of an external magnetic field, the flywheel receives a Lorentz force which is opposite to the direction of the deviation, so that the position of the flywheel 1 is adjusted. As such, the flywheel 1 is always keep at a balanced position.

Figure 16:
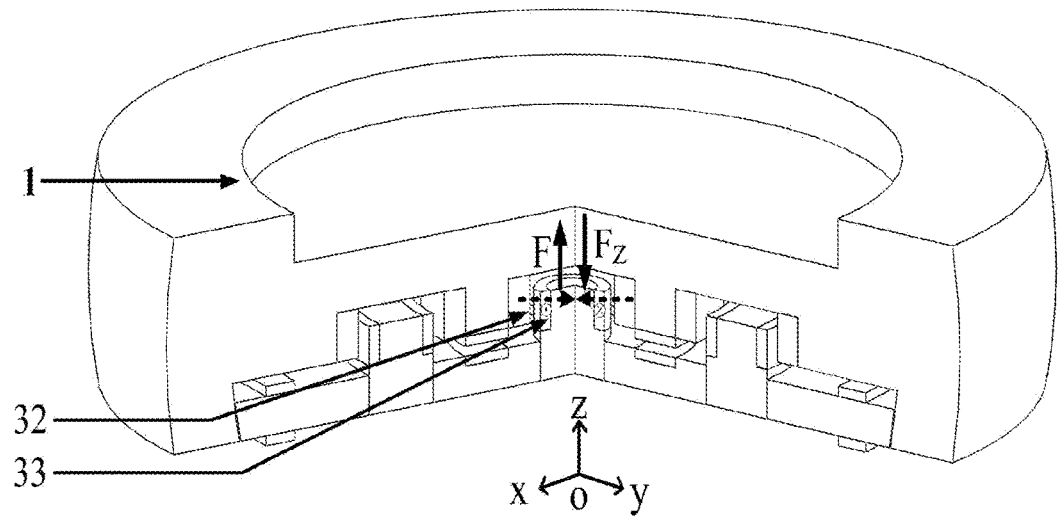
FIG. 16 is a principle diagram showing control of the axial magnetic bearing in the five-degree-of-freedom magnetic bearing in FIG. 8.

Implementation of suspension with a single axial degree of freedom. As shown in FIG. 16, it is assumed that the flywheel 1 is deviated toward the positive direction of the Z axis at a certain moment. An external magnetic field generated by the axial permanent magnet 32 has been mentioned above. A control current is applied to the axial control coil 33. Under the action of the external magnetic field, a Lorentz force F is generated, so that the flywheel 1 receives a force $F_z$ along the negative direction of the Z axis. As such, the flywheel 1 returns to the axial balanced position.

Figure 17:
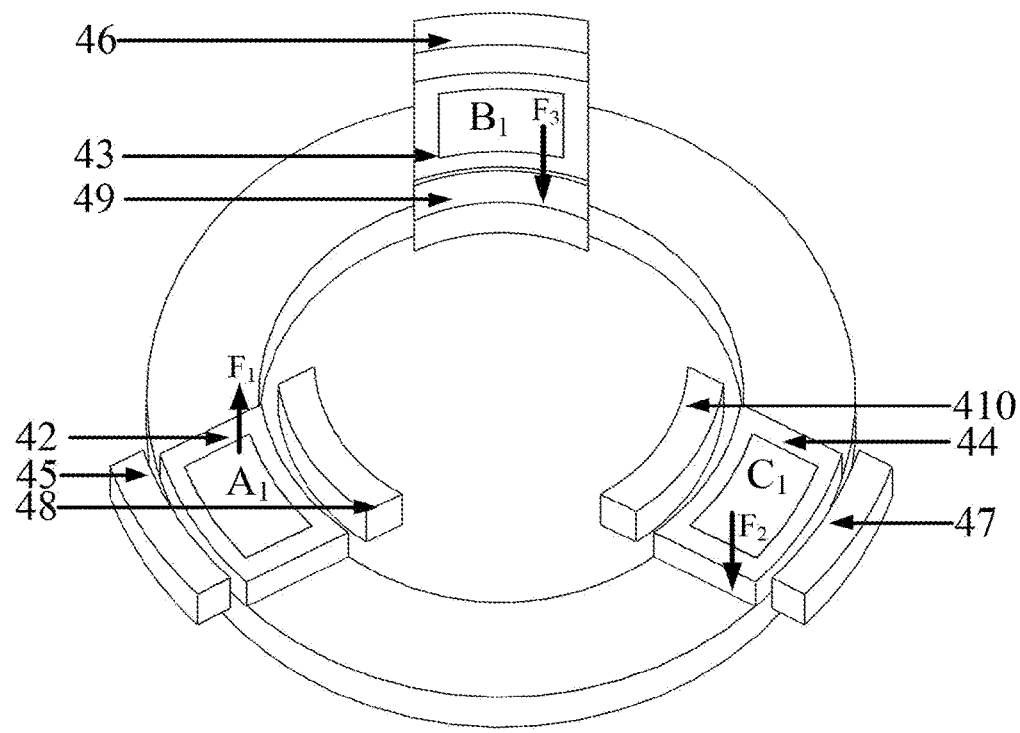
FIG. 17 is a principle diagram showing control of the torsional magnetic bearing generating a Lorentz force in the five-degree-of-freedom magnetic bearing in FIG. 8.
Figure 18:
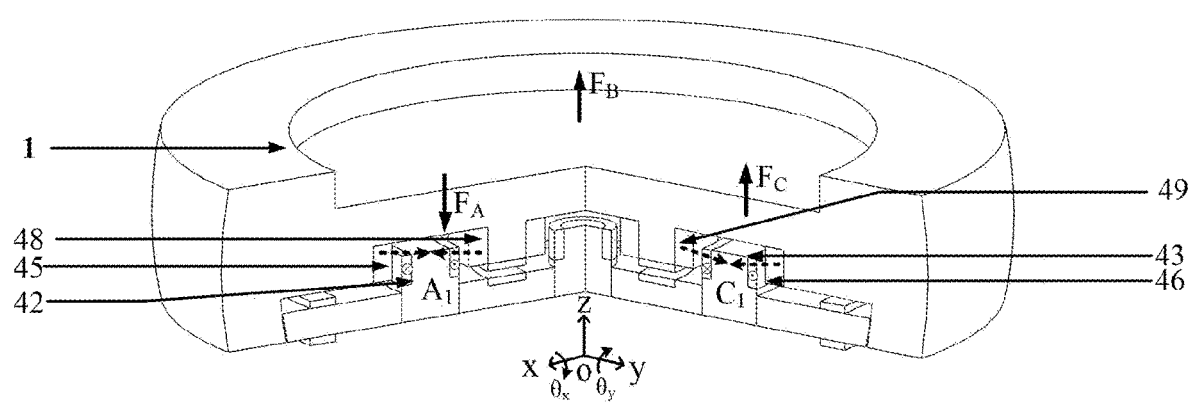
FIG. 18 is a principle diagram showing control of the torsional magnetic bearing generating an axial force in the five-degree-of-freedom magnetic bearing in FIG. 8.

Implementation of suspension with two torsional degrees of freedom: As shown in FIG. 17 and FIG. 18, for the convenience of description, the torsional magnetic poles are named $A_1$, $B_1$, and $C_1$ respectively, where the magnetic pole $A_1$ is in left-right symmetry along the X axis. It is assumed that the flywheel 1 is twisted in a direction $\theta_y$ shown in FIG. 17 at a certain moment. External magnetic fields generated by the torsional permanent magnets 45, 46, 47, 48, 49, and 410 have been mentioned above. A control current shown in the figure is applied to the torsional control coils 42, 43, and 44. Under the action of the external magnetic fields, Lorentz forces $F_1$, $F_2$, and $F_3$ are generated. Therefore, the flywheel 1 receives forces FB and Fc along the positive direction of the Z axis at the magnetic pole $B_1$ and the magnetic pole $C_1$ respectively, and receives a force FA along the negative direction of the Z axis at the magnetic pole $A_1$, so that a torsional moment opposite to the direction of the deviation is generated, which causes the flywheel 1 to return to the balanced position. According to the electromagnetic force equation $$F = \frac{\Phi^2}{2\mu_0 S},$$

where Φ is a synthetic air-gap flux, S is a cross-sectional area of the spherical radial stator poles 511, 512, and 513 of the radial magnetic bearing, and $\mu_0$ is an air permeability, a control current may be applied to the radial control coils 52, 53, and 54 of the radial magnetic bearing. A control flux generated by the control current and a magnetic bias flux generated by the permanent magnets are superimposed in the radial spherical air gap, so that the synthetic air-gap fluxes between the flywheel 1 and the radial stator poles 511, 512, and 513 are increased or decreased. In this way, the electromagnetic force received by the flywheel 1 on one side increases, and the electromagnetic force received by the flywheel 1 on the other side decreases, so that the position of the flywheel is adjusted. As such, the flywheel 1 is always keep at a balanced position.

Figure 19:
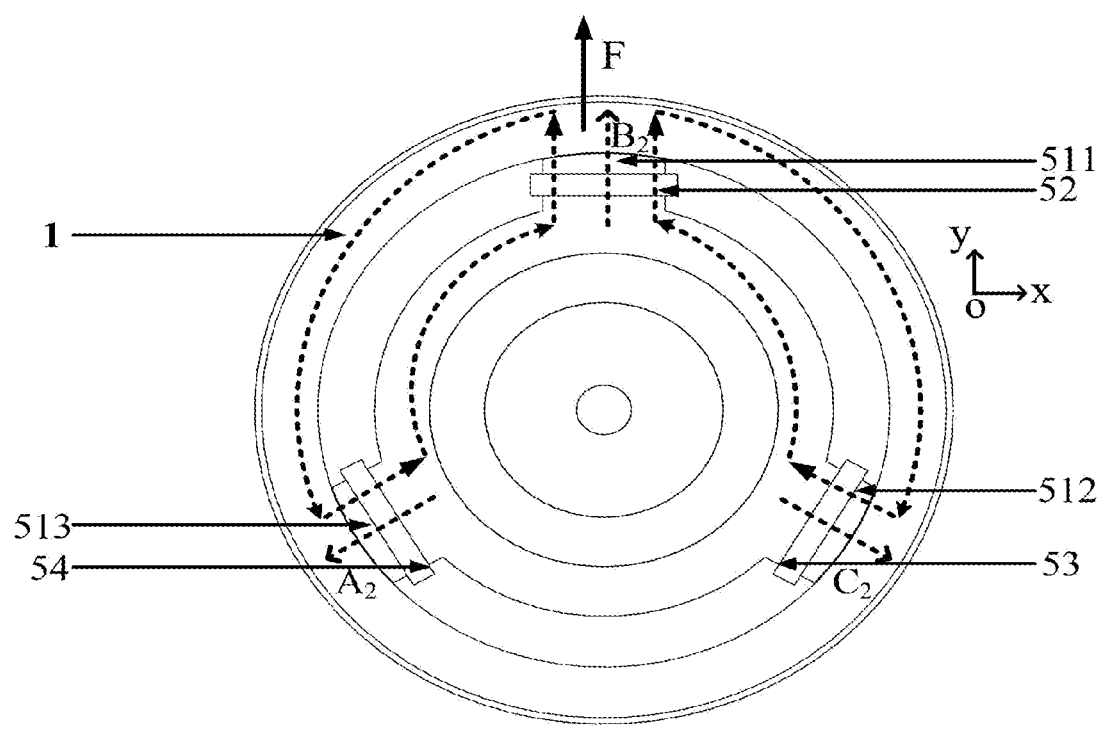
FIG. 19 is a principle diagram showing control of the radial spherical magnetic bearing in the five-degree-of-freedom magnetic bearing in FIG. 8.

Implementation of suspension with two radial degrees of freedom: As shown in FIG. 19, for the convenience of description, the radial magnetic poles are named $A_2$, $B_2$, and $C_2$ respectively, where the magnetic pole $B_2$ is in left-right symmetry along the Y axis. It is assumed that the flywheel 1 is deviated toward in the negative direction of the Y axis at a certain moment. A control current is applied to the radial control coils 52, 53, and 54, to generate a control flux shown in FIG. 19. The control flux generated by the control current and a magnetic bias flux generated by the permanent magnets are vector-superimposed in each radial spherical air gap between the flywheel 1 and the radial stator poles 511, 512, and 513 (where big dashed arrows represent the control flux, small dashed arrows represent the magnetic bias flux, arrows in the same direction represent the superposition of magnetic fluxes, and arrows in opposite directions represent the cancellation of magnetic fluxes), so that the synthetic air-gap flux at the magnetic pole $A_2$ and the magnetic pole $C_2$ is decreased, and the synthetic air-gap flux at the magnetic pole $B_2$ is increased. The flywheel 1 receives a synthetic magnetic pulling force F along the positive direction of the Y axis, so that the position of the flywheel 1 is adjusted. As such, the flywheel 1 returns to the radial balanced position.

During operation of the ultra-thin flywheel battery, to achieve the stable suspension of the flywheel, the five degrees of freedom of the flywheel 1 need to be precisely controlled, and it is necessary to monitor the eccentric displacement of the flywheel 1 in real time. Displacement information of the flywheel 1 is acquired in a non-contact manner using an electrical displacement sensor, and the flywheel 1 is controlled using an external control circuit, thus forming a closed-loop control of the flywheel.

To further adapt to the complex vehicle conditions and road conditions, the present invention adopts a concept of multi-dimensional multi-space-time control, i.e., to implement different control strategies for different vehicle driving conditions and road conditions (multi-dimensional), including a case where the vehicle is stationary, a case where the vehicle is moving at a constant speed, a case where the road surface is flat, a case where the flywheel is in standby state, or a case where the vehicle driving condition and road condition change, etc.). Depending on whether the vehicle driving conditions and the road conditions are complex or not, the magnetic bearings with different properties are used in a time-sharing manner (multi-space-time), to make use of the advantages of these bearings at the same time.

To further describe the operation mode of the present invention, a multi-dimensional multi-space-time control method for the ultra-thin flywheel battery is analyzed as follows:

An identification module is configured for the present invention, and is integrated into a controller. When the vehicle-mounted flywheel battery is used under a suitable operating condition or road condition, deviations in the five degrees of freedom are $\Delta X$, $\Delta Y$, $\Delta Z$, $\Delta\theta_x$, and $\Delta\theta_Y$, namely, a displacement deviation $\Delta X$ of the flywheel along the X axis, a displacement deviation $\Delta Y$ of the flywheel along the Y axis, a displacement deviation $\Delta Z$ of the flywheel along the Z axis, a rotation deviation $\Delta\theta_x$ of the flywheel along the X axis, and a rotation deviation $\Delta\theta_Y$ of the flywheel along the Y axis. An operating condition or road condition is defined by taking deviation ranges of the degrees of freedom of the flywheel battery with a large deviation under this operating condition or road condition as set thresholds. The specific thresholds are determined by the suitable operating conditions or road conditions, and a multi-dimensional operating condition and road condition database is set based on these thresholds. A specific control method is as follows: When $\Delta X$ exceeds its corresponding threshold and the deviations in the other degrees of freedom are less than their corresponding thresholds, it is defined that the vehicle is accelerating/decelerating, and the controller is caused to drive the radial control coils 52, 53, and 54. When $\Delta X$ and $\Delta Y$ exceed their corresponding set thresholds and the deviations in the other degrees of freedom are less than their corresponding set thresholds, it is defined that the vehicle is turning, and the controller is caused to drive the radial control coils 52, 53, and 54. When $\Delta X$, $\Delta\theta_x$, and $\Delta\theta_Y$ exceed their corresponding thresholds respectively and the deviations in the other degrees of freedom are less than their corresponding set thresholds, it is defined that the vehicle is driving uphill/downhill, and the controller is caused to drive the radial control coils 52, 53, and 54 and the torsional control coils 42, 43, and 44. When $\Delta Z$, $\Delta\theta_x$, and $\Delta\theta_Y$ exceed their corresponding thresholds respectively and the deviations in the other degrees of freedom are less than their corresponding set thresholds, it is defined that the vehicle is driving under a bumpy road condition, and the controller is caused to drive the axial coil 33 and the torsional control coils 42, 43, and 44.

During operation of the ultra-thin flywheel battery, real-time position data of the flywheel 1 is continuously detected using a sensor, and compared with position data of flywheel 1 at a balanced position, so as to calculate a deviation value and orientation of the flywheel 1 relative to the center of sphere, which are imported to the identification module to identify the vehicle driving condition and road condition of the flywheel battery. Accordingly, a time-sharing control mode is selected, and the controller is caused to drive the magnetic bearing coils to operate, thus forming a closed-loop control of the flywheel 1. For example, when it is identified that the flywheel battery is operating during vehicle acceleration/deceleration, due to the high stability of the flywheel battery of the present invention, the stability of the flywheel battery can be achieved by controlling only the radial control coils 52, 53, and 54. For the specific control method, reference can be made to the above-mentioned suspension with two radial degrees of freedom and FIG. 19. When it is identified that the flywheel battery is operating during driving under a bumpy road condition, due to the high stability of the flywheel battery of the present invention, if the road grade is low, e.g., A-grade road, the stability of the flywheel battery can be achieved by controlling only the axial coil 33. For the specific control method, reference can be made to the above-mentioned suspension with the single axial degree of freedom and FIG. 16. If the road grade is high, the stability of the flywheel battery can be achieved by controlling the axial coil 33 and the torsional control coils 42, 43, and 44. For the specific control method, reference can be made to the above-mentioned suspension with two torsional degrees of freedom and FIG. 17. Similarly, when it is identified that the flywheel battery is operating under other operating conditions or road conditions or a combination of complex operating conditions and road conditions, according to the setting of the multi-dimensional operating condition and road condition database, while ensuring the system stability, as few magnetic bearing coils as possible may be driven, to effectively reduce the loss caused by the control coil, thereby to achieve the low-loss control of the present invention.

According to the above, the present invention can be realized. Other variations and modifications made by those skilled in the art without departing from the spirit and protection scope of the present invention shall fall within the protection scope of the present invention.

What is claimed is:

1. An ultra-thin vehicle-mounted magnetic suspension flywheel battery, comprising a shell, wherein
   a motor bracket, an axial flux motor, a flywheel, and an inner stator, a coil, and a permanent magnet of a five-degree-of-freedom magnetic bearing are coaxially arranged in the shell from top to bottom,
   the flywheel consists of an upper layer, a middle layer, and a lower layer which are continuous, wherein
      the upper layer is a flywheel upper annular layer which is in a shape of a circular ring, an upper annular groove is formed in a middle of the flywheel upper annular layer, and the axial flux motor is placed in the upper annular groove;
      the middle layer is a flywheel middle layer consisting of a flywheel disc layer and a flywheel double ring layer below the flywheel disc layer, wherein
      the flywheel disc layer is in a shape of a solid disc,
      the flywheel double ring layer consists of an annular flywheel rotor pole and a flywheel annular outer layer coaxially distributed with respect to a central axis,
      the annular flywheel rotor pole is in a shape of a circular ring concentrically protruding downward from a middle of a lower surface of the flywheel disc layer,
      an annular inner groove is formed in a middle of the annular flywheel rotor pole,
      an outer circumference of the flywheel annular outer layer is a spherical envelope surface, and
      a middle-layer annular cavity is formed between an inner wall of the flywheel annular outer layer and an outer wall of the annular flywheel rotor pole;
   the lower layer is a flywheel lower annular layer which is in a shape of a circular ring, a lower annular groove is formed in a middle of the flywheel lower annular layer and the annular inner groove, the middle-layer annular cavity, and the lower annular groove are communicated with each other and jointly used for placing the inner stator, the coil, and the permanent magnet of the five-degree-of-freedom magnetic bearing.

2. The ultra-thin vehicle-mounted magnetic suspension flywheel battery according to claim 1, wherein the five-degree-of-freedom magnetic bearing comprises an axial magnetic bearing, a repulsive magnetic bearing, a torsional magnetic bearing, and a radial spherical magnetic bearing from inside to outside, and stator parts of the magnetic bearings constitute the inner stator of the five-degree-of-freedom magnetic bearing and are fixedly connected to a lower end cover of the shell.

3. The ultra-thin vehicle-mounted magnetic suspension flywheel battery according to claim 2, wherein
   the axial magnetic bearing comprises an axial magnetic bearing stator, an axial permanent magnet, and an axial coil, the axial magnetic bearing stator is coaxially sheathed in the axial permanent magnet, the axial permanent magnet is magnetized radially and has an inner side as an N pole and an outer side as an S pole, an upper section of the axial magnetic bearing stator is an axial stator pole, the axial coil which is in a shape of a circular ring is wound on the axial stator pole, and the axial stator pole and the axial magnetic bearing stator are configured to be assembled to form a complete cylindrical shape; the axial permanent magnet is in a shape of a ring, and is tightly sheathed in the annular inner groove;
   the repulsive magnetic bearing comprises a repulsive magnetic bearing stator, and first and second repulsive permanent magnets distributed coaxially, the repulsive magnetic bearing stator is in a shape of a ring and is fixedly sleeved outside the axial magnetic bearing stator, an upper surface of the repulsive magnetic bearing stator is provided with an annular groove configured for mounting the second repulsive permanent magnet therebelow, the first repulsive permanent magnet is located exactly above and not in contact with the second repulsive permanent magnet, the first repulsive permanent magnet and the second repulsive permanent magnet are both magnetized axially, and N poles of the first repulsive permanent magnet and the second repulsive permanent magnet are opposite to each other; an upper end surface of the first repulsive permanent magnet is closely attached to a lower end surface of the annular flywheel rotor pole;
   the torsional magnetic bearing comprises a torsional magnetic bearing stator, first to third torsional control coils, and first to sixth torsional permanent magnets, the first to sixth torsional permanent magnets are all magnetized radially, and the first to third permanent magnets on an outer side have a same magnetization direction and each have an inner side as an N pole and an outer side as an S pole; the fourth to sixth torsional permanent magnets on an inner side have a same magnetization direction and each have an inner side as an S pole and an outer side as an N pole, the torsional magnetic bearing stator is in a shape of a circular ring and is fixedly sleeved outside the repulsive magnetic bearing stator, first to third identical fan-shaped torsional stator poles are evenly arranged on an upper surface of the torsional magnetic bearing stator along a circumferential direction, the first to third torsional control coils are respectively wound on the first to third identical fan-shaped torsional stator poles, and one of the first to third identical fan-shaped torsional stator poles is arranged between each of the fourth to sixth torsional permanent magnets on the inner side and the first to third torsional permanent magnet on the outer side that is radially opposite to the each of the fourth to sixth torsional permanent magnet the first to third torsional permanent magnets on the outer side are closely attached to an outer sidewall of the middle-layer annular cavity, and an inner ring of each of the fourth to sixth torsional permanent magnets on the inner side is closely attached to an outer ring of the annular flywheel rotor pole;
   the radial spherical magnetic bearing comprises a radial magnetic bearing stator and first to third radial control coils, the radial magnetic bearing stator which is in a shape of a ring is fixedly sleeved outside the magnetic bearing stator, first to third identical radial stator poles, extending radially outward are evenly arranged on an outer sidewall of the radial magnetic bearing stator along a circumferential direction, an outer sidewall of each of the first to third identical radial stator poles is a part of a spherical surface, and the first to third radial control coils are connected in series and are respectively wound on the first to third identical radial stator poles in one-to-one correspondence.

4. The ultra-thin vehicle-mounted magnetic suspension flywheel battery according to claim 3, wherein upper and lower end surfaces of the axial permanent magnet are flush with upper and lower end surfaces of the annular flywheel rotor pole respectively, heights of the first to third torsional permanent magnets-on the outer side are equal to a height of the middle-layer annular cavity, and upper and lower surfaces the three-first to third torsional permanent magnets on the outer side are flush with upper and lower surfaces of the middle-layer annular cavity respectively, the fourth to sixth torsional permanent magnets on the inner side are flush with the upper and lower end surfaces of the annular flywheel rotor pole respectively, an upper end surface of the axial coil is flush with an upper end surface of the axial stator pole, lower end surfaces of the axial permanent magnet and the axial coil are flush with a lower end surface of the axial stator pole, and upper end surfaces of the first to third identical fan-shaped torsional stator poles are flush with the upper end surface of the axial stator pole.

5. An operating method of the ultra-thin vehicle-mounted magnetic suspension flywheel battery according to claim 3, comprising the following steps:
step A: in a case of acceleration/deceleration or turning, driving the first to third radial control coils by a controller, to make the ultra-thin vehicle-mounted magnetic suspension flywheel battery stable;
step B: in a case of driving uphill/downhill, driving the three-first to third radial control coils and the first to third torsional control coils by the controller, to make the ultra-thin vehicle-mounted magnetic suspension flywheel battery stable:
step C: in a case of driving on a bumpy road, driving the axial coil and the first to third torsional control coils by the controller, to make the ultra-thin vehicle-mounted magnetic suspension flywheel battery stable.

6. The ultra-thin vehicle-mounted magnetic suspension flywheel battery according to claim 1, wherein the axial flux motor consists of upper and lower motor rotors, a motor stator in a middle, upper and lower motor permanent magnets, and upper and lower motor coils, the motor stator is in a middle of the axial flux motor in an axial direction, and the axial flux motor is symmetrical about a middle section of the motor stator, and the motor stator is fixedly connected to a middle of an upper end cover of the shell by the motor bracket.

7. The ultra-thin vehicle-mounted magnetic suspension flywheel battery according to claim 6, wherein the motor stator is of a continuous three-layer structure comprising an upper layer, a motor stator middle layer, and a lower layer, wherein
the upper layer comprises twelve motor stator poles arranged at equal intervals along a circumferential direction, twelve upper motor coils are respectively wound on the twelve motor stator poles, the motor stator middle layer is in a shape of a circular ring, the lower layer comprises twelve motor stator poles arranged at equal intervals along the circumferential direction, and twelve lower motor coils are respectively wound on the twelve motor stator poles;
the motor stator is respectively spaced apart from the upper and lower motor permanent magnets by a spacing in the axial direction, eight fan-shaped upper and lower motor permanent magnets are evenly arranged along the circumferential direction respectively, and are closely and correspondingly attached to the upper and lower motor rotors respectively, outer diameters of the upper and lower motor rotors are equal to an inner diameter of the upper annular layer, and the upper and lower motor rotors are tightly and fixedly connected to the upper annular groove.

8. The ultra-thin vehicle-mounted magnetic suspension flywheel battery according to claim 1, wherein a diameter-to-height ratio of the flywheel is 5.2.

9. The ultra-thin vehicle-mounted magnetic suspension flywheel battery according to claim 1, wherein the shell consists of a shell body, an upper end cover, and a lower end cover sealedly connected to each other, and is made of foamed aluminum; the shell body is a hollow partial-spherical shell, and is provided with a heat-dissipation fin and a heat-dissipation groove on an outer circumferential surface of the shell.

10. An operating method of the ultra-thin vehicle-mounted magnetic suspension flywheel battery according to claim 1, wherein the flywheel is used as a rotor to implement mutual conversion between mechanical energy and electrical energy, and the method is divided into three stages: charging, energy retention, and discharging, wherein
in the charging stage, the axial flux motor operates to drive the flywheel to rotate, and the flywheel stores electrical energy in a form of kinetic energy, to complete conversion from electrical energy to mechanical energy;
in the energy retention stage, the flywheel maintains a constant speed; and
in the discharging stage, the flywheel outputs energy to drive the axial flux motor to generate electricity, to complete conversion from mechanical energy to electrical energy.

* * * * *